(12) United States Patent
Garay et al.

(10) Patent No.: US 8,887,287 B2
(45) Date of Patent: Nov. 11, 2014

(54) METHOD AND APPARATUS FOR SOFTWARE INTEGRITY PROTECTION USING TIMED EXECUTABLE AGENTS

(75) Inventors: Juan A. Garay, West New York, NJ (US); Lorenz Francis Huelsbergen, Hoboken, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1366 days.

(21) Appl. No.: 10/976,353

(22) Filed: Oct. 27, 2004

(65) Prior Publication Data

US 2006/0090209 A1   Apr. 27, 2006

(51) Int. Cl.
*H04N 7/16* (2011.01)
*G06F 21/57* (2013.01)

(52) U.S. Cl.
CPC ........ *G06F 21/57* (2013.01); *G06F 2221/2103* (2013.01); *G06F 21/577* (2013.01); *G06F 2221/2151* (2013.01)
USPC ............ 726/26; 726/22; 726/23; 726/24; 726/25; 713/168; 713/176; 709/224

(58) Field of Classification Search
CPC ............ G06F 21/57; G06F 2221/2151; G06F 2221/2103; G06F 21/577
USPC ............... 713/176, 168; 709/224; 726/22–26
See application file for complete search history.

(56) References Cited

U.S. PATENT DOCUMENTS

| | | | | |
|---|---|---|---|---|
| 2003/0023872 | A1* | 1/2003 | Chen et al. | 713/200 |
| 2003/0056210 | A1* | 3/2003 | Joshi et al. | 725/25 |
| 2003/0105822 | A1* | 6/2003 | Gusler et al. | 709/206 |
| 2003/0145318 | A1* | 7/2003 | Mont et al. | 717/178 |
| 2003/0159055 | A1* | 8/2003 | Robbins et al. | 713/193 |
| 2004/0049698 | A1 | 3/2004 | Ott et al. | |
| 2004/0123137 | A1* | 6/2004 | Yodaiken | 713/200 |
| 2004/0139340 | A1* | 7/2004 | Johnson et al. | 713/194 |
| 2005/0021966 | A1* | 1/2005 | Chow et al. | 713/176 |

FOREIGN PATENT DOCUMENTS

| | | |
|---|---|---|
| EP | 1 282 023 A | 2/2003 |
| WO | WO 00/54125 A | 9/2000 |
| WO | WO 01/25884 A | 4/2001 |
| WO | WO 2004/055634 A | 7/2004 |

OTHER PUBLICATIONS

Shaneck et al., "Remote Software-Based Attestation for Wireless Sensors," ESAS 2005, LNCS 3813, pp. 27-41, 2005.
Kennel et al., "Establishing the Genuinity of Remote Computer Systems," 12th USENIX Security Symposium. pp. 295-310, 2003.

* cited by examiner

*Primary Examiner* — Kambiz Zand
*Assistant Examiner* — Tongoc Tran
(74) *Attorney, Agent, or Firm* — Ryan, Mason & Lewis, LLP

(57) ABSTRACT

A method and apparatus are disclosed for evaluating the security of at least one client. An executable program is executed by the client being evaluated. A result is received from the executable program, and an evaluation of the result indicates whether the client has been corrupted. The executable program is one of a plurality of possible programs. The result may be evaluated based on an elapsed time between when the executable program is provided to the client and when the result is received. The executable program may include at least one function that writes to a memory of the client. A program blinding technique is also disclosed to generate executable programs.

20 Claims, 4 Drawing Sheets

*FIG. 5*

```
{
    a = 0;
    while (a < 10) {
        b+=M[a];
midloop:
        a++;
    }
...
    if(x > 0)                    510
        goto midloop;
...
}
```
500

*FIG. 6*

| statement | defines | uses |
|---|---|---|
| { | | |
| a = 10; | a | |
| b = a + 1; | b | a |
| while (a-- > 0) { | a | a |
| c = a+b+M[a]; | c | a,b,M[a] |
| b++; | b | b |
| } | | |
| return c; | | c |
| } | | |

605 → while (a-- > 0) {

600 statement   610 defines   620 uses

FIG. 7

```
agent fragment:  ←— 710

LOAD (0xfc00), r0;
    STORE r0, (0x1200);
    JMP 0x0100;

interpreter core:  ←— 720 instr = GET_INSTR(pc);
    op1 = GET_OP1(pc);
    op2 = GET_OP2(pc);

switch (instr) {
    LOAD:    if (protected(op1))
                      op2 = *(translate(op1))
             else     op2 = *op1;
             break;
    STORE:   if (protected(op1))
                      *(translate(op1)) = op2;
             else     *op1 = op2;
             break;
    JMP:     if (protected(op1))
                      pc = translate(op1))
             else     pc = op1;
             break;
    }
```

FIG. 8

```
agent fragment                              ←— 800 a2 = seed;
for (i = 0; i < m; i++) {
    a1 = random(a2);
    a2 = random(a1);
    t = M[a1];
    M[a1] = M[a2];
    M[a2] = t;
}
```

METHOD AND APPARATUS FOR SOFTWARE INTEGRITY PROTECTION USING TIMED EXECUTABLE AGENTS

FIELD OF THE INVENTION

The present invention relates to computer security techniques and, more particularly, to challenge-response schemes that monitor the integrity of computer systems in a distributed environment.

BACKGROUND OF THE INVENTION

Computer systems (e.g., software, hardware, and their interconnection) must be trusted to a high degree in order for them to be used in critical and sensitive computations. Most computing platforms, however, are relatively devoid of protections against malicious attacks where, in particular, resident software is modified or reconfigured. Although software clients can, and arguably should, be protected with special security hardware (e.g., with cryptographic chips), they usually are not due to material costs and the additional engineering complexities they impose. In addition, for systems that are already deployed in the field, an integrity scheme based on software is the only option.

A number of challenge-response schemes have been proposed to determine and monitor the integrity of software subsystems in a distributed hardware/software environment. For example, a number of challenge-response schemes have been proposed to protect mobile phone clients communicating with hosts in wireless telephony networks. A user of a mobile phone can modify the software of the mobile phone. Thus, when the phone interacts inside a wireless network, the host components that communicate with the phone client may unknowingly interact with malicious code. Such code could be used to capture client information or present invalid or deceptive information to the host. Most proposed challenge-response schemes have focused on security mechanisms and policies that determine whether the requests issued by the mobile code should be allowed or denied by the (remote) host executing the code.

Another body of work considers the case of malicious hosts. For example, Esparza et al., "Limiting the Execution Time in a Host: A Way of Protecting Mobile Agents," IEEE Sarnoff Symposium on Advances in Wired and Wireless Communications (2003), proposed using the execution time of an agent to detect possible malicious behavior by the host in order to protect the agent against abuses from a malicious host. Specifically, each host is required to save the agent's arrival and departing time. When the agent returns to the host of origin, a set of checks verifies that no host spent more time than expected executing the agent; if some host exceeds the time bound, then it is considered suspicious of malicious behavior.

Kennell and Jamieson, "Establishing the Genuinity of Remote Computer Systems," 12$^{th}$ USNIX Security Symposium, 295-310 (2003), suggested sending a challenge problem to a machine in order to verify that the machine is running the correct version of uncorrupted software (specifically, a kernel). In this system, referred to as "Genuity," the challenge problem is essentially a checksum (i.e., a one-byte sum) of the contents of pseudo-random memory addresses. The challenge may also incorporate other hardware-specific values into the checksum. The trusted host preparing the challenge problem also computes the checksum, and if the host being tested calculates the same checksum as the trusted host and returns it "quickly enough," the host is considered genuine, since it is assumed that there would be no fast simulation.

While such challenge-response schemes based on an evaluation of the execution time of a known function provide an effective basis for detecting malicious behavior, they suffer from a number of limitations, which if overcome, could greatly improve the security of and integrity of software subsystems in a distributed hardware/software environment. For example, the Genuity system relies on only one type of function for verifying the integrity of clients. Thus, an adversary can more easily predict the type of function to expect. A need therefore exists for a challenge-response scheme that employs a number of different functions, thereby making it more difficult to predict the functionality of the agents and making such integrity protection stronger.

SUMMARY OF THE INVENTION

Generally, methods and apparatus are provided for evaluating the security of at least one client. An executable program is executed by the client being evaluated. A result is received from the executable program, and an evaluation of the result indicates whether the client has been corrupted. According to one aspect of the invention, the executable program is one of a plurality of possible programs. For example, the executable program may be selected from the plurality of possible programs, such as a library of programs, or may be randomly generated.

According to another aspect of the invention, the evaluation of the result includes evaluating an elapsed time between when the executable program is provided to the client and when the result is received. Generally, the executable program should include at least one function that has a time complexity for being analyzed by a potential adversary that violates a time constraint for receiving the result.

Yet another aspect of the invention employs executable programs that include at least one function that write to a memory of the client. In this manner, a plurality of programs can communicate over time using a function that writes to a memory location of the client. In one embodiment, the executable program includes a plurality of programs that perform a pseudo-random permutation of a memory of the client, evaluate one or more locations of the memory; and restore the memory to a desired state.

The executable program may be generated using a disclosed program blinding technique. A target program may be generated by obtaining a first program; and combining the first program with a random program to generate the target program. The target program inherits one or more properties of the first program. For example, the first program and the random program may be combined by interleaving one or more instructions from the first program and the random program.

A more complete understanding of the present invention, as well as further features and advantages of the present invention, will be obtained by reference to the following detailed description and drawings.

BRIEF DESCRIPTION OF THE DRAWINGS

FIG. 5 illustrates a program fragment containing an unstructured control flow that leads to expensive analysis times by potential adversaries and is thus a desirable property for agents;

FIG. 6 gives a short sample program and the results of a defines-uses analysis on the code;

FIG. 7 illustrates a code fragment for an exemplary agent and the inner loop of a virtual machine to interpret the code during an interpreter attack; and FIG. 8 illustrates exemplary code to implement a random permutation of all of the memory of a Responder in accordance with one type of agent employed by the present invention.

DETAILED DESCRIPTION

Figure 1:
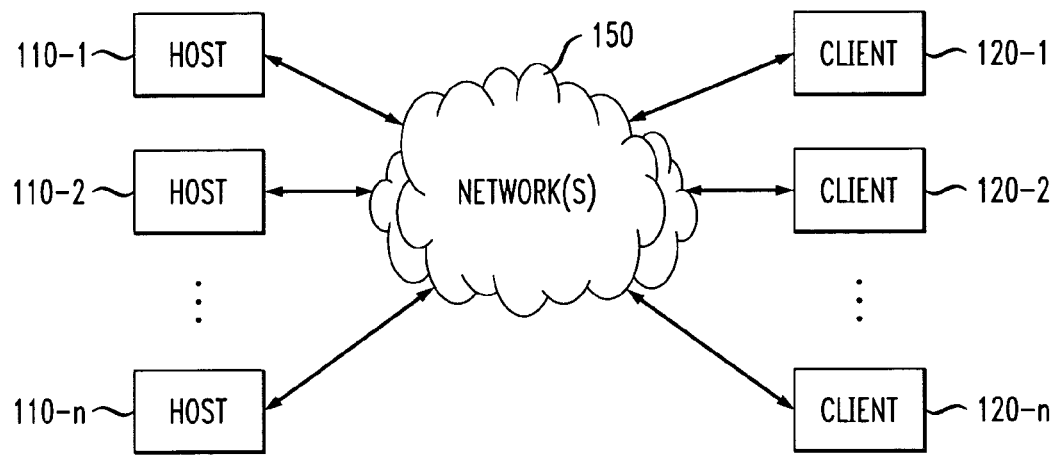
FIG. 1 illustrates an exemplary network environment in which the present invention can operate.

FIG. 1 illustrates an exemplary network environment 100 in which the present invention can operate. As shown in FIG. 1, the network environment 100 is comprised of a collection of computational nodes interconnected in a (possibly ad hoc) network 150. The set of computational nodes comprises two types of entities: one or more secure hosts 110-1 through 110-n (hereinafter, collectively referred to as hosts 110), and one or more possibly physically insecure clients 120-1 through 120-n (hereinafter, collectively referred to as clients 120). The insecure clients 120 are insecure in the sense of being subject to malicious attacks.

According to one aspect of the invention, discussed further below in conjunction with FIG. 2, at least one of the hosts 110, operating as a trusted challenger, employs a Timed Executable Agent Systems (TEAS) to evaluate the security of one or more clients 120, also referred to herein as responders. Thus, the trusted challenger issues an authenticated challenge to a possibly corrupt responder. According to one aspect of the invention, the issued challenge is an executable program that can potentially compute any function on the responder. The responder must compute not only the correct value implied by the agent, but also must complete this computation within time bounds prescribed by the challenger.

As used herein, a Timed Executable Agent Systems is computer code (i.e., an agent) designed to run on a client 120 whose integrity is being ascertained. Since the client 120 will be asked to execute code unknown to it, the agent must be signed by the sending host 110 to signify that the code stems from a trusted entity. Upon receipt of a TEAS agent, the client 120 must execute the code immediately and return any results the agent produces to the issuing host. Since the agent is an arbitrary computer program that runs potentially with full permissions on the client, it is capable of reading and writing all memory locations and performing calculations on the client state (in the form of checksums, for example). More complicated agent schemes might perhaps reconcile state modifications made by a prior agent's visit, among many other possibilities.

An important aspect of TEAS is that the execution period of the agents on the clients, as well as the transmission time, is timed. The output of an agent must be received by the host within a fixed period of time for the output to be valid. As discussed herein, this helps prevent adversaries running on the client from expending computation on analysis of the agent and from introducing other overheads, such as those incurred in dynamic interpretation of the agent. The more tightly coupled the target system, the more precise the a priori time-bounds for an agent can be. For example, in a wireless base-station box where communication is through a tightly coupled backplane, communication as well as execution times can be precisely modeled. On the other hand, in a system that involves remote communication, or even communication over the Internet, tight bounds on in-transit times may be more difficult to ascertain.

In general, TEAS can be considered a probabilistic approach to integrity verification. A single agent may check only a single memory location or compute the hash of a small memory region. It is also probabilistic in the sense that if a reply is not received in time, it may only signify a network delay and not necessarily a critical integrity violation. It is the collection of many TEAS agents operating over a long time period that can establish, with a high degree of probability, that the software running on the client is as intended and expected.

According to another aspect of the invention, a method is disclosed for generating computational agents randomly (or pseudo-randomly) in order to populate efficiently large libraries of useful agents. Manually written agents, interspersed with random machine-generated agents, both further obfuscated to create additional semantically equivalent variants, provide a large obstacle that adversaries would need to "learn" in order to combat TEAS protections effectively.

Model, Definitions and System Requirements

As previously indicated, the present invention allows host nodes 110 to establish the integrity of one or more client systems 120. The clients 120 are assumed to execute computer programs specified with the RAM model of computation. The RAM model corresponds well with the architectures of contemporary microprocessors and digital signal processors. Load-store and memory-based instruction sets, as well as stack architectures, are readily captured by the RAM model. For ease of illustration, hosts 110 and clients 120 that are embodied in the exemplary embodiment as uniprocessors. The variable C, $\{C\}$=cycles/sec, denotes the CPU rate of such processors. The clients 120 are also assumed to not possess any tamper-resistant hardware (containing, for example, a secure processor to perform cryptographic operations). The memory of a client 120 basically consists of three areas: code, data and unused memory. Naturally, parts of the data area may be unused at different points in time. The variable m equal to |M| denotes the size of a client's memory, measured in number of words.

Regarding communication, it is further assumed that the nodes 110, 120 in the system 100, especially the hosts 110, have a fairly accurate estimate of the transmission delays in the network 150. This can be modeled, for example, using the hosts' knowledge of the available bandwidth on the links or channels connecting the host nodes 110 to the client nodes 120. The variable B, where $\{B\}$ equals bits/sec, denotes the available bandwidth on a given link. It is noted that estimation of measures such as computation rate and bandwidth can be performed empirically.

Adversary Model

The TEAS of the present invention provides defense against client nodes 120 being corrupted and/or taken over by an adversary (e.g., a computer virus, the enemy or a malicious insider). The present invention assumes that any adversary A attacking the system is bound to perform polynomial-time computation; in other words, and more formally, their computational power is that of a probabilistic polynomial-time Turing machine.

Attacks can range from adversary A simply making modifications to the client's configuration or state, to actively controlling the client. The defense strategy against these attacks will consist of sending programs ("agents") to perform various tasks at the client. In order to go unnoticed, the adversary will have to provide the correct output in a timely fashion. Thus, the types of adversaries are divided into two classes, according to the type of analysis that they will perform on such incoming programs.

Off-Line Adversaries

An off-line adversary controlling a client will try to analyze the incoming query programs without running them. Recall that in static analysis of programs, programs are analyzed in isolation, without inputs and without the state of the machine where they will run. An off-line adversary will perform a similar type of analysis, except that it might also have access to inputs and state of the client. $A_{off}$ denotes the class of off-line adversaries.

On-Line Adversaries

An on-line adversary controlling a client will also be able to run the incoming programs. $A_{on}$ refers to this class of on-line adversaries. A node (client) that has been attacked by an adversary is referred to as a corrupted node. An adversary is assumed to execute at a client whose computing power is known. Thus, computation steps can be easily transformed into absolute time.

Timed Executable Agent System (TEAS)

Figure 2:
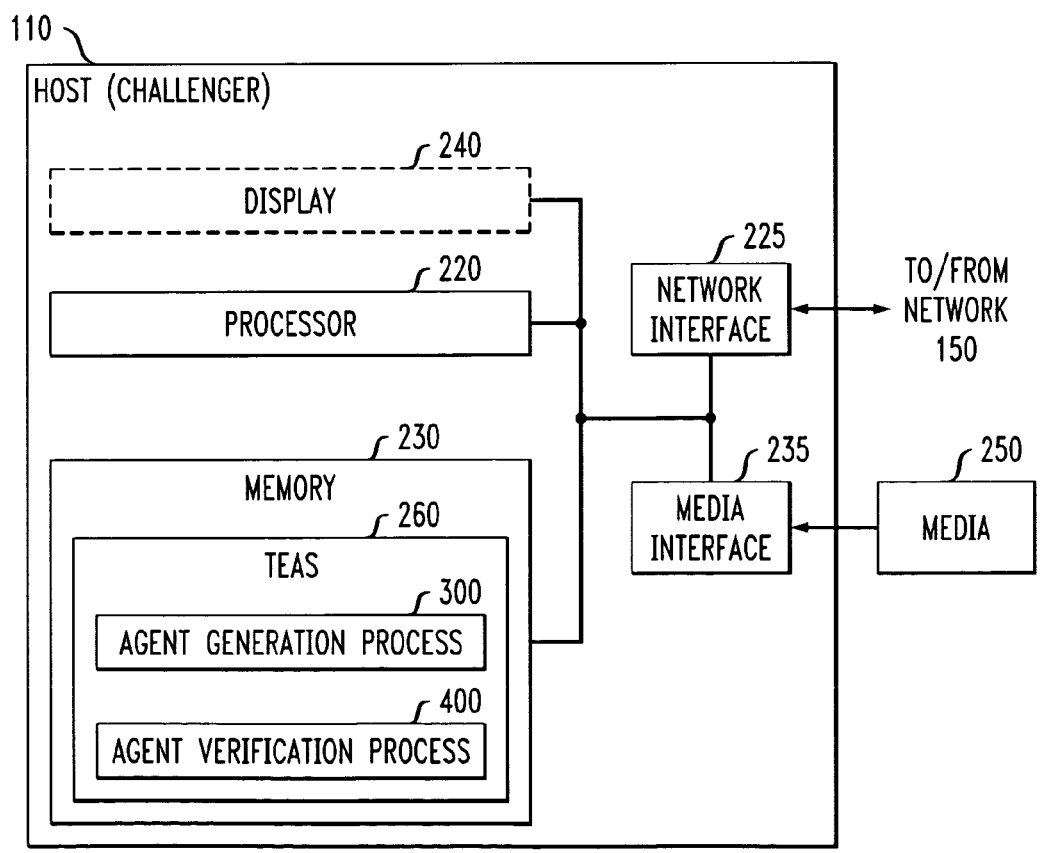
FIG. 2 is a schematic block diagram illustrating an exemplary host of FIG. 1 incorporating features of the present invention.

FIG. 2 is a schematic block diagram illustrating an exemplary host 110 incorporating features of the present invention. As shown in FIG. 2, the host 110 interacts with media 250. The host 110 comprises a processor 220, a network interface 225, a memory 230, and optionally, a media interface 235 and display 240. Network interface 225 allows the host 110 to connect to a network 150, while media interface 235 allows the host 110 to interact with media 250, such as a Digital Versatile Disk (DVD) or a hard drive. Optional video display 240 is any type of video display suitable for interacting with a human user of host apparatus 200. Generally, video display 240 is a computer monitor or other similar video display.

As shown in FIG. 2, the exemplary host 110 includes the TEAS 260. It is noted that the TEAS 260 may be implemented by the host 110 itself, as shown in FIG. 2, or by some central server shared by a number of hosts 110. As previously indicated, the Timed Executable Agent Systems issues challenges (i.e., agents) between the various nodes 110, 120 in the network 150. Again, the node issuing the challenge (typically a secure host 110) is referred to as the Challenger, and the node being queried (typically a client 120) is referred to as the Responder. Besides the a priori-unpredictable result expected by Challenger from the execution of the agent at the target node, an important quantifiable side effect is the time it takes the agent executing at Responder to provide the (correct) result. Examples of tasks that such agents might perform include start executing at an arbitrary point of Responder's state, perform some (random) computation including the content of memory locations or the state of Responder's stack, or performing a random permutation of its memory content.

As shown in FIG. 2 and as discussed further below in conjunction with FIGS. 3 and 4, the exemplary TEAS 260 includes an agent generation process 300 and an agent verification process 400 that incorporate features of the present invention. An $(\epsilon, A)$ Timed Executable Agent System (TEAS) is thus defined by the agent generation process 300 and the agent verification process 400, running on the node 110 acting as Challenger.

Figure 3:
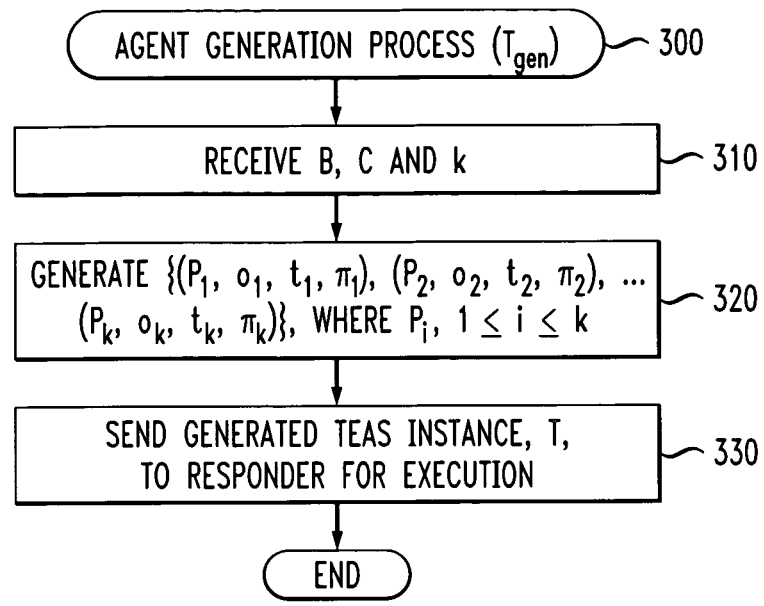
FIG. 3 is a flow chart describing an exemplary implementation of the agent generation process ($T_{gen}$) of FIG. 2.

FIG. 3 is a flow chart describing an exemplary implementation of the agent generation process $(T_{gen})$ 300. Generally, $T_{gen}$ receives environmental parameters (the link's bandwidth B and Responder's CPU rate C) and a security parameter k as inputs during step 310. Thereafter, a TEAS instance, T, is generated during step 320, comprised of one or more programs (agents), $P_i$, to be executed at Responder, equal to $\{(P_1, o_1, t_1, \pi_1), (P_2, o_2, t_2, \pi_2), \ldots (P_k, o_k, t_k, \pi_k)\}$, where $P_i$, $1 \leq i \leq k$, $o_i$ is its expected output, $t_i$ is its expected transmission and execution time, and $\pi_i$ is its patience threshold. The properties that the programs (agents), $P_i$, should possess are discussed below in the sections entitled "Integrity Protection from Off-Line Adversaries" and "Integrity Protection from On-Line Adversaries." For a discussion of exemplary techniques for generating agents, see the section entitled "Automatic Agent Generation." The generated TEAS instance, T, is sent to the Responder for execution during step 330, before program control terminates.

Figure 4:
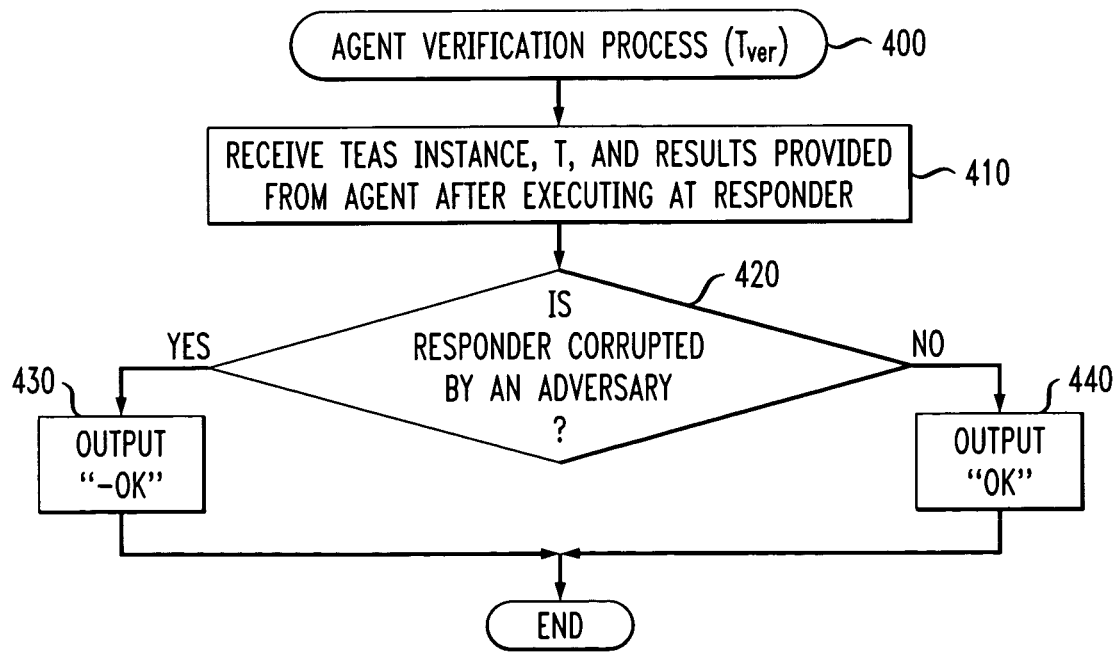
FIG. 4 is a flow chart describing an exemplary implementation of the agent verification process ($T_{ver}$) of FIG. 2.

FIG. 4 is a flow chart describing an exemplary implementation of the agent verification process $(T_{ver})$ 400. As shown in FIG. 4, the agent verification process $(T_{ver})$ 400 initially obtains as input during step 410 a TEAS instance T and a list of k pairs $\{(o'_i, t'_i)\}_1^k$, where $o'_i$ is the result provided by agent $P_i$ after executing at Responder, and $t'_i$ is the elapsed time since the agent was sent to Responder until the result was received, as measured on Challenger's clock, respectively. A test is performed during step 420 to determine if the Responder is corrupted by an adversary. If it is determined during step 420 that the Responder is corrupted by an adversary, then an output of '–OK' is generated during step 430, otherwise an output of 'OK' is generated during step 440, before program control terminates.

If Responder is corrupted by an adversary in the adversary class A, then the probability that $T_{ver}$ will output 'OK' during step 440 is less than $\epsilon$. On the other hand, if Responder is not corrupted, then $T_{ver}$ should not equivocate and always output 'OK'. In fact, the variance of the environmental parameters (in particular, the link's bandwidth) should be taken into account to provide a two-sided error definition. To simplify, some hard bounds are assumed on these parameters that are never violated. The probabilities are taken over the random choices made by the algorithms.

More concretely, let $|P_i|$ denote the size of the ith program, and let $D(P_i)$ denote the number of dynamic instructions executed during $P_i$'s execution. Then $t_i$ will typically be computed by $T_{gen}$ as follows:

$$t_i = \frac{|P_i|}{B} + \frac{|o_i|}{B} + \frac{|D(P_i)|}{C}. \quad (1)$$

Regarding $T_{ver}$, the type of tests that it will be performing on its inputs will be of the form:

$$\text{if } \exists\, i \in \{1, \ldots, k\} \text{ s.t. } o_i \neq o'_i \text{ OR } \frac{t'_i}{t_i} > \pi_i \text{ then output' } - OK'.$$

Program Analysis Background and Requirements

A halting program computes a function from a set of input values to a set of output values in a finite number of computation steps. Two programs are considered syntactically equivalent if their texts are the same; i.e., the bit strings representing the programs are identical. The expression txt(P)

is used to denote the text of program P. Two programs are semantically equivalent if they have the same input/output relation.

Off-line adversaries are stymied in accordance with the present invention using the algorithmic complexity of program analysis or the undecidability of most non-trivial program properties, as discussed further below in the Section entitled "Integrity Protection from Off-Line Adversaries." The automatic analysis of a program's text, typically for optimization purposes, is well understood. Generally, the behavior of a program P in terms of the program's output values as well as of any side effects that the program may perform may be determined in part through some global data-flow analysis on the program. Given P's sequence of instructions, txt(P), some of the following tasks must be performed in order to deduce statically its operation:

1. extract P's control flow graph (CFG) GP;
2. convert GP to a reducible flow graph G'P (see below); and
3. perform global data flow analysis on GP (or G'P).

In the best case, the extraction of the CFG has time complexity $\Omega(n)$, where n is typically some static measure of the size of the program, P, such as the number of instructions the program contains, or the number of assignments the program has; but in the case of certain types of branches, this complexity rises to superlinear $\Omega(n^2)$ or even higher. Also, the resulting CFG may or may not be reducible depending again on the absence (presence) of branches into loops.

A goal of agent generation is to make analysis difficult. This can be done, for example, by introducing irreducible flow constructs. FIG. 5 illustrates a program fragment 500 containing an unstructured control flow that leads to an irreducible flow graph, which in turn gives rise to expensive analysis times by potential adversaries. FIG. 5 contains a program fragment 500 that, due to an unstructured goto statement 510 into a loop body, gives rise to an irreducible flow graph. Conversion of an irreducible graph to a reducible one is possible via so-called node-splitting, which can, however, increase the program size (and hence its CFG size) exponentially. Global data flow analysis with the iterative algorithm on an irreducible CFG has complexity $\Omega(n^2)$, but can approach linear time on a reducible CFG using alternate algorithms.

System Requirements

As shown in FIG. 2, the Challenger host 110 may be embodied using commercially available computing platforms, such as PCs or servers, as modified herein to interact with a TEAS system. The Challenger need only periodically issue challenges and perform bookkeeping of its client Responders. A Responder, on the other hand, must meet special system requirements regarding the access and use of its resources in order to be used in the TEAS system. In particular, the Responder client 120 must permit the execution of arbitrary code, albeit authenticated by a trusted Challenger 110. In addition, the Responder's operating system must allow an agent full and uninterrupted access to the machine for the duration of the agent's execution (since agents are typically small and have low time complexities, this is typically not an issue). In practice, this means that Responder must disable interrupts to prevent external or internal events such as IO or time-slicing from the operating system's process scheduler. A Responder must also allow an agent access to all memory.

The Responders must also be provisioned to receive and execute agents. A Responder therefore requires a (small) portion of free memory in which to place the agent as well as the trivial software machinery for doing this placement and for launching execution of the agent. More complicated schemes might vary the locations of memory used for this; since agents are general programs, they can modify the software, memory locations, and parameters used for subsequent agent invocations on a given Responder.

Although it is unlikely that off-the-shelf operating systems, such as ones common on PC's, are adequate for TEAS due to the aforementioned requirements, the customizable real-time operating systems used in many devices such as mobile phones or proprietary computing appliances like wireless base stations are sufficiently customizable and low-level to admit a TEAS security approach.

Integrity Protection from Off-Line Adversaries via Program Analysis

As previously indicated, an off-line adversary is one that may inspect and analyze an agent it receives or intercepts, and may or may not have the agent's execution environment available to it, but it is not allowed to run it. The present invention combats such an off-line adversary using agents generated based on principles of algorithmic complexity of program analysis or the undecidability of most non-trivial program properties.

Undecidability-Based Protection

The undecidability of non-trivial program properties as given by Rice's theorem makes an off-line analysis of an agent infeasible. See, e.g., Hopcroft and Ullman, Introduction to Automata Theory, Languages and Computation (Addison-Wesley, 1979). Namely, properties such as whether generally a program halts or how many steps it takes are non-computable so they cannot (for all programs) be determined by an off-line adversary.

Consider the non-trivial program property of computing the number of instructions a TEAS agent executes. An agent could incorporate this dynamic value into the result it returns to the Challenger. The number of instructions executed can be trivially computed by the agent as it runs, but is non-computable a priori. Any amount of off-line analyses cannot exactly determine such an undecidable property.

Complexity-Based Protection

Effectively, an off-line adversary is a program-analysis based adversary, i.e., one which attempts to analyze the flow of an agent and tries to deduce the result(s) of the agent using this analysis. By doing this, the adversary hopes to discern, for example, which memory locations the agent accesses. In the case where the adversary needs to "protect" or "disguise" certain locations because they are being used by the adversary toward a malicious end, such an analysis can help pinpoint which locations must be temporarily "restored" to their proper values before executing the agent. It is noted that address values may be computed dynamically in the agent, so non-trivial analyses are necessary to determine all critical locations. Furthermore, the analysis must infer also the function that the agent computes on its inputs. As previously indicated, program analysis has inherent time and space complexities which can be used to force the adversary to expend computation, and hence time, on the analysis task which makes it harder for the adversary to return the desired value(s) to the Challenger in a timely manner.

To combat off-line adversaries using program analyses in such a manner, the agents can be configured so that the time complexity of performing the analysis causes the adversary to violate the TEAS time frame for receiving a response. In particular, the superlinear time complexity of performing program analysis is employed (e.g., $\Omega(n^2)$) in the case of iterative data-flow analysis.

For example, consider a system with the following bandwidth and computation parameters: B equal to $10^6$ bytes/second and C equal to $10^9$ cycles/second and on average the processor completes one instruction per cycle. Suppose some TEAS agent is of size $10^3$ instructions where each instruction is four bytes in size. Furthermore, suppose this agent has linear dynamic runtime therefore requiring at least $10^3/10^9=0.000001$ seconds to complete on the client. If the agent's result fits in four bytes, the total time for communicating the agent from the host to the client and returning the client's result to the host is bounded below by $4 \times 10^3/10^6 + 4/10^6 = 0.004004$ seconds for a total communication and computation time of $t \geq 0.004005$. Now, if the adversary must perform at a minimum of a $\Omega(n^2)$ analysis with an implied constant $\geq 1$, the adversary must expend an additional (at least) 0.01 seconds of computation time giving it a time of $t' > 0.014005$, and therefore dominating T by a factor of almost (roughly) 3.5 (a significant amount that should be readily detectable). By increasing the size of the agent further this gap can be made arbitrarily large.

First, it is important that the mix of agents sent to the client contain agents with fast (linear or constant running times) in addition to more complex agents (perhaps with quadratic or cubic execution time). This will ensure that for some agents an the analysis will dominate the TEAS time patience threshold ($\pi$) for those agents; this point can be trivially handled by judicious agent construction. Second, it must be possible to guarantee that for many non-trivial agents, an adversary's analysis time be asymptotically larger than the agents running time.

Common analyses can be made to require superlinear (in the size of the agent) $\Omega(n^2)$ time (this again is possible through careful agent construction). An off-line adversary to TEAS must determine the critical locations inspected by an agent, the function it computes, and also any side-effects the agent may perform. A side-effect is a modification to a program's (agent's) state that does not directly affect the result value but can influence the subsequent computation by the client or of future agents. An adversary A therefore must perform some global data-flow analysis on the agent in question in order to determine this. As mentioned above, the agent writer should make analysis asymptotically more expensive than execution, for at least some subset of agents. Analysis can be made asymptotically more expensive than execution, for example, by:

1. making CFG extraction expensive; or
2. ensuring that the extracted CFG is irreducible and that its conversion to reducible form explodes the size of the resulting CFG.

Doing (1) or (2) or both, implies that CFG extraction is quadratic, the data flow analysis is quadratic, or the size of the agent P after conversion to reducible form P' is of the form $n^\delta$, for some $\delta > 1$ (so that even a linear analysis on P' is no longer linear in |P|).

Instances of analyses the adversary would have to do are def-use (defines-uses) and available expressions analyses. The first binds definition statements for a variable x to uses of x within subsequent expressions. Available expression analysis computes, for every program point, the set of previously computed expressions that are still accurate given all variable definitions between the initial computation of the expression and the current program point. On irreducible flow graphs, such analyses require $\Omega(n^2)$ time using the standard iterative algorithm. However, if the flow graph is reducible, they could be performed faster, e.g., in time $\Omega(n \log n)$ using alternative algorithms, such as balanced path compression (see, Muchnick and Jones, Program Flow Analysis: Theory and Applications (Prentice Hall, 1981)). But again, the required reduction step can increase the size of the CFG drastically.

FIG. 6 gives a short sample program 600 and the results of a def-use analysis on it (defines in column 610 and uses in column 620). At least a def-use analysis (or equivalent) is necessary for adversary A to analyze sufficiently an agent in general. In the sample program 600, the adversary must determine the value of c returned by the last statement. To do so, the adversary must examine (among many other things) the definitions of variables and their subsequent uses in forming the resultant expression. In sample program 600, it is evident that the adversary A must uncover the definition of the variable c in the while loop 605, which in turn depends on the values of the variables a and b, which are first initialized before the loop and then repeatedly reassigned in it. Furthermore, using def-use information is often not sufficient as the example also illustrates: arrays are indexed using dynamic values (e.g., M{a} and loops are executed multiple times). Such program constructs complicate the analyses required to even loosely bound, let alone precisely determine, the values and side-effects computed by a TEAS agent. As indicated above, and to summarize, this information cannot be obtained in linear time in an off-line manner using known program analysis techniques.

Automatic Agent Generation

An attractive approach to agent generation is to do it automatically on the challenge server, by either precomputing an agent library or by generating agents on-the-fly as needed. Unfortunately, machine generation of programs is currently insufficiently advanced to create programs anywhere close to as complex and specific as can be created by humans. However, as described in this section, it is possible to combine a small (hand-written) program with simple properties with a random, obliviously generated one, referred to as program blinding.

Blinding Programs with Pseudo-Random Agents

According to another aspect of the invention, agents are generated using a program blinding technique. Given a machine language L with its syntax and semantics, or more concretely, its (fixed) set of instructions together with their corresponding actions, a set of op codes and operands and a set of rules to form instructions in the language, a (pseudo-)random program of size n is called, the result of (pseudo-)randomly generating n valid instructions in L. Note that some of the programs generated this way will not be terminating.

An important aspect to the blinding operation is the notion of cross-over taken from genetics. Given two programs $P_1$ and $P_2$, with their respective I/O relations and sets of properties, the cross-over between $P_1$ and $P_2$ is a program $P_3$, obtained by means of some efficient transformation, with a set of properties that contains some of the input programs' properties. In other words, $P_3$ "inherits" some of the properties possessed by $P_1$ and/or $P_2$.

A particular kind of cross-over operation is employed in an exemplary implementation, denoted "$\otimes$," referred to as program blinding, making an analogy with the notion of "blinding" in cryptography. Generally, given a program P, the idea is to combine P with a random program so that the resulting program maintains some of P's properties, but its behavior (e.g., its output) is difficult to predict. There would be several ways to produce a juxtaposition of the two programs. In our case, as typically the target program would be much smaller than the random program, $\otimes$ is defined as the interleaving of each of P's instructions uniformly at random in the random program text. $P^* \leftarrow P \otimes P_R$, where $P_R$ is a random program, the blinded program.

As indicated above, a program P is combined with a random program so that the resulting program maintains some of P's properties, but its behavior (e.g., its output) is difficult to predict. A program P is ($\epsilon$, N)-semantically uncertain if no adversary $A \in A_{off}$, given txt(P) and an input instance I, can determine $O \leftarrow P(I)$ after N steps of analysis with probability better than $\epsilon$, for all I. Blinded programs, as described above, must be ($\epsilon b$, n)-semantically uncertain, where n equals $|P^*|$.

Finally, the blinded program's output may or may not depend on the original program's input. Blinded programs where the dependency is preserved are referred to as input-sensitive blinded programs.

Example Construction and Security Arguments

Consider a complexity-based TEAS against off-line adversaries, based on the automatic agent generation technique described above. For ease of illustration, one of the analysis-hardening properties discussed above in the Section entitled "Complexity-Based Protection," is employed that of generating agents with irreducible CFG's.

Let $p_{irred}^n$ denote the fraction probability that a randomly generated agent of size n contains an irreducible CFG (and thus implies a $\Omega(n^2)$ analysis time). Generally, $T_{gen}$, the TEAS generation algorithm, will be generating instances that include $((1-p_{irred}^n), n)$-uncertain programs, for suitable n. Depending on the particular generation process, $p_{irred}^n$ can be estimated to various degrees of accuracy. In principle, this probability can be estimated analytically, by for example estimating in the uniform instruction sampling process the probability of loop occurrence with backward jumps occurring into them (See, FIG. 5). Alternatively (or additionally), if an agent library is pre-computed off-line, random agents can be first selected which possess a high number of backward jumps, and then further program analysis (using the best known methods) applied to them. An on-the-fly generation process can also be aided by this off-line "knowledge base."

$T_{gen}$, the TEAS generation algorithm, generateS an ($\epsilon$, Aoff) TEAS instance. First, $T_{gen}$ is given the target program (s) that is (are) supposed to perform some checks at Responder. As mentioned at the beginning of the section, target programs are assumed to be simple programs consisting of a handful of operations. Then, given input CPU rate C at Responder and link bandwidth B (and its variance statistics), $T_{gen}$ chooses n so that the time consumed by a quadratic analysis would dominate the time incurred by a fast-executing (e.g., at most linear) agent by a large factor. How large this factor is would depend on the bandwidth variance statistics. For example, a factor of three or more assuming a zero probability of half bandwidth. This allows $T_{gen}$ to fix a preliminary patience threshold for all agents (e.g., $\pi=2$); however, $T_{gen}$ might perform some additional fine tuning after the next step.

$T_{gen}$ now proceeds to blind the target program(s) with k terminating random programs of size n such that:

1. every program is input-sensitive; and
2. the running time of (at least) k'<k agents is at most n, where k' is the minimum integer satisfying $(1-p_{irred}^n)^{k'} < \epsilon$.

$T_{gen}$ determines the input sensitivity of the random programs by running them. At this time, besides recording for each blind program $P^*_i$, $1 \leq i \leq k$, its output $o_i$, $T_{gen}$ also computes and records $t_i$, i.e., the sum of the programs' running time (or, equivalently, the number of dynamic instructions) plus their expected transmission time, according to Equation (1). In the case of computation-intensive agents, $T_{gen}$ might also adjust (lower) their patience threshold, to reflect the fact that computation time for these agents will be the dominating term. Finally, $T_{gen}$ outputs TEAS instance $\{(P^*_i, o_i, t_i, \pi_i)\}^k_1$ thus constructed.

The challenger now submits the agents in the TEAS instance, one by one, to the responder. $T_{ver}$ takes the TEAS instance and the list of k pairs $\{(o'_i, t'_i)\}^k_1$, where $o'_i$ is the result provided by agent $P_i^*$ and $t'_i$ is the elapsed time since the agent was sent to the Responder until the result was received, as measured on the clock of the Challenger, respectively, and applies the test outlined herein to determine whether Responder is corrupted or not.

Integrity Protection from On-Line Adversaries

To illustrate, consider this example. An adversary is trying to protect a memory location l. As a concrete example, l may contain configuration data that has been changed to modify the characteristics of a set-top box. When the Responder now receives a TEAS agent P, the adversary applies analyses to the program P before running the program to determine if the memory locations accessed by P contain l. If the adversary is able to determine that P accesses l, the adversary can restore l to the proper value, and cache the improper malicious value at a location l' that the adversary has determined not to be accessed by P. When P completes, it returns a correct value to the Challenger (since l contained the proper value), but then the adversary can reinstall its improper configuration into l.

In this section, on-line adversaries that control Responder are considered that are able to run the incoming agents (in other words, perform a "run-time analysis" on them). In this case, the hardness of the static-analysis problems from the previous section goes away, and new methods are required in order to detect an attack.

A typical (legal) memory configuration of Responder would consist of a code region and a data region; the former would be invariant and typically finger-printable, while the latter would vary and contain unused areas, depending on the state of Responder's execution. It is assumed that exact knowledge of the used/unused portions of the data area are not known to Challenger, otherwise somewhat simpler defenses against on-line adversaries would be possible. An on-line adversary controlling Responder could mount in this region an interpreter attack on an incoming agent. Essentially, using such code, the adversary can control the execution of the agent (three instructions given as an example) in such a way that loads and stores from/to protected regions as well as executions of pieces of code in such regions are always avoided.

FIG. 7 illustrates a code fragment 710 for an exemplary agent and the inner loop 720 of a virtual machine to interpret the code 710 during an interpreter attack. As shown in FIG. 7, three instructions of the agent's code 710 are given as an example. Note that the overhead for interpreting the agent using the interpreter core 720 would be constant (say, five to ten instructions per simulated instruction). Again, this would always be possible to carry out by the adversary in some unused area of memory.

On-line Defense Construction and Security Arguments

At a high level, the strategy for defeating this type of interpreter adversary will be to generate a TEAS instance which will either force the adversary to relinquish control of Responder if the instance is executed completely, or risk detection by again not being able to respond to queries/agents in a timely manner. Assumptions about the architecture and system requirements of the Responder are described above.

Let $m=|M|$ denote the size of a Responder's memory, measured in number of bytes. It is assumed in this section that m is set and known to Challenger, and not increased by the adversary. In order to combat on-line adversaries acting according to the assumptions above, $T_{gen}$ generates TEAS instances having the basic structure of agents $\{P_1, P_2, P_3\}$, where:

1. $P_1$ is an agent carrying code for a pseudo-random permutation of Responder's memory. P1 returns a 'ready' message upon completion. FIG. 8 illustrates exemplary code 800 to implement a random permutation of all of the memory of a Responder.
2. $P_2$ carries queries on (now random) locations of memory and program control locations (e.g., the program stack). $P_2$ could itself consist of several agents.
3. $P_3$ is an agent carrying code for the inverse pseudo-random permutation that $P_1$ carried. In other words, $P_3$ restores the state of Responder (that is, if everything goes well).

First assume that $P_1$, the agent carrying the permutation code, gets executed at Responder. Then, necessarily, Responder will be under control of the agent. $P_2$, the agent carrying the queries, will now be able to inspect Responder's configuration. This is possible since Challenger, knowing the seed of the pseudo-random permutation, knows how the memory locations get mapped because of it. By the same token, the execution of the queries should be very fast. Additionally (and importantly) the query agents will also be able to inspect the program call stack, which should point to areas of valid code, whose contents can also be verified. Should $T_{ver}$ detect a time violation in the execution of $P_1$ or $P_2$, or receive an incorrect result from $P_2$, it outputs '–OK'.

If, on the other hand, $P_1$ does not get executed at Responder, then the probability of correctly responding to a $P_2$ query is, roughly, 1/m. The adversary could also retain control of Responder by computing the memory mapping without performing the actual permutation of memory locations by constructing a table containing a mapping from a location to its permuted location. This would allow an interpreter attack to decipher location queries and thereby provide correct values in response to a memory lookup from the Challenger. This is possible since the adversary would know the seed that $P_1$ carries. Recall that a Responder is assumed to have bounded memory resources where this bound is known to the Challenger. The memory requirements for such a table would be O(m) and the adversary would face the risk of being disabled as in this case. For example, in the limit the Challenger might permute all locations which would force the Responder to create and maintain a table larger than its available memory. Again, partial construction of such a table would have a low probability of success in answering queries from $P_2$.

Applications of TEAS

The TEAS disclosed herein are general and can be adapted to many applications for which system integrity is to be tested. For example, TEAS can be used in the following exemplary applications:

1. terminal devices, such as mobile phones or set-top boxes;
2. computing "appliances," such as wireless base stations; and
3. sensor networks Terminal Devices For the first TEAS application, consider a network of set-top boxes (or mobile phones) where the provider owns both the network and the terminal devices (e.g., the cable network and cable modems, or a satellite television system). It is of extreme interest to the provider to ensure that the terminal devices are not misused or that rogue devices do not receive service. Malicious users routinely "hack" cable-modems, for example, to increase the bandwidth delivered to them. Similarly, people reprogram their satellite receivers to get additional unauthorized services. Using TEAS, one can help protect against such misuse by periodically sending an agent to inspect the state of active cable modems (or satellite receivers). Since the provider typically owns all of the infrastructure, device and timing parameters are fully known. Furthermore, transmission times from the network's edge routers to a cable modem can be quite deterministic. Modifications of the terminal hardware is much more difficult (for both the provider and a malicious hacker) than reprogramming its software, making such a system an ideal candidate for integrity protection via TEAS.

Computing Appliances

A computing appliance is defined as a tightly coupled collection of co-located computing devices. An example of this is a wireless base station that contains a controller board (computer) and a number of channel cards (also containing microcontrollers). The network connecting these components is a typically a fast backplane with highly deterministic transit times. Often base station channel cards can operate at various capacity levels depending on the license purchased with the card. The operating capacity, if only a software configuration, is changeable by unscrupulous operators. TEAS can aid in protecting such a system by having the controller card serve as the Challenger and all channel cards as Responders. As in the above example, agents would query critical configuration information.

Sensor Networks

Sensor networks are similar to the first example since sensor networks too might span a geographically large area with associated network latencies. Different, however, is the threat level. In a military or critical mission application, it is of utmost importance that data gathered by the sensors be true. TEAS can contribute here because of the flexibility of the challenges (full-fledged programs). If, for instance, one surmises a sensor has been co-opted and is being operated by a malicious entity, custom challenges can be designed to probe the unauthorized modification of the software. Furthermore, agents could in some cases even be used to check for hardware tampering if the hardware modifications alter the operation of some software.

Practical Issues

The relevant practical issues concern two aspects of TEAS. First, setting the parameters required for agent selection and generation must be considered, and then, implementation details of the client Responders must be considered.

Parameters of the agent model require fairly precise specification of the computation rates on the Responders as well as of the communication rates between the Challenger and its Responders. Since it is assumed that both the Challenger and the Responder are operated by the same entity, it is fairly easy to establish device characteristics empirically in a lab. For instance, one can precisely measure the time required per instruction on the Responder processor(s). Similarly, one can measure the bandwidth and network latencies by sending large random streams and measuring actual throughput and latency. Variance statistics can then be computed from the empirical measurements to give acceptable operating ranges.

The TEAS implementation of agents must be compatible with the operating system and environment of the client Responder's on which it will run. In particular, system issues such as process scheduling and interrupts impact the design of a TEAS system. However, since a TEAS agent is small relative to modem software (tens of thousands of bytes is a large agent) and its execution is swift, it will not interfere with all but the most time-critical applications on the Responder. For example, in many applications it suffices to suspend the current application's processes and to disable interrupts immediately upon receipt of an agent. Upon receipt, the agent, authenticated and loaded into the memory it specifies, is run, and its result returned to the Challenger. The Responder's application is now resumed.

System and Article of Manufacture Details

As is known in the art, the methods and apparatus discussed herein may be distributed as an article of manufacture that itself comprises a computer-readable medium having computer-readable code means embodied thereon. The computer-readable program code means is operable, in conjunction with a computer system such as the computer system 110 shown in FIG. 2, to carry out all or some of the steps to perform one or more of the methods or create the apparatus discussed herein. For example, the computer-readable code is configured to implement the agent generation process 300 and the agent verification process 400.

The computer-readable medium may be a recordable medium (e.g., floppy disks, hard drive, optical disks such as a DVD, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk.

Memory 230 configures the processor 220 to implement the methods, steps, and functions disclosed herein. The memory 230 could be distributed or local and the processor 220 could be distributed or singular. The memory 230 could be implemented as an electrical, magnetic or optical memory, or any combination of these or other types of storage devices. Moreover, the term "memory" should be construed broadly enough to encompass any information able to be read from or written to an address in the addressable space accessed by processor 220. With this definition, information on a network, accessible through network interface 225, is still within memory 230 because the processor 220 can retrieve the information from the network. It should be noted that each distributed processor that makes up processor 220 generally contains its own addressable memory space. It should also be noted that some or all of computer system 110 can be incorporated into an application-specific or general-use integrated circuit.

It is to be understood that the embodiments and variations shown and described herein are merely illustrative of the principles of this invention and that various modifications may be implemented by those skilled in the art without departing from the scope and spirit of the invention.

We claim:

1. A method for evaluating the security of at least one remote client, comprising:
providing at least one executable program to be executed by said remote client, wherein said at least one executable program is one of a plurality of possible programs and wherein said at least one executable program provides an unpredictable result;
receiving a result from said at least one executable program executed by said remote client; and
determining whether said remote client has been corrupted based on an evaluation of a correctness of said unpredictable result, wherein said at least one executable program is randomly generated and wherein said evaluation of said unpredictable result includes comparing an expected time to an elapsed time between when said at least one executable program is provided to said client and when said result is received, wherein said expected time is based on an expected transmission time of said unpredictable result and an expected execution time by said at least one executable program to compute said unpredictable result.

2. The method of claim 1, wherein said at least one executable program is selected from said plurality of possible programs.

3. The method of claim 1, wherein an analysis of said at least one executable program takes significantly longer than execution of said at least one executable program.

4. The method of claim 1, wherein said at least one executable program includes an irreducible flow construct.

5. The method of claim 1, wherein said at least one executable program includes at least one function that evaluates an undecidable property of said function.

6. The method of claim 1, wherein said at least one executable program includes at least one function that has a time complexity for being analyzed by a potential adversary that violates a time constraint for receiving said result.

7. The method of claim 1, wherein said at least one executable program is generated using a program blinding technique.

8. The method of claim 1, wherein said at least one executable program includes one or more operations that write to a memory of said client.

9. The method of claim 1, wherein said at least one executable program includes a plurality of programs that communicate over time using at least one function that writes to a memory location of said client.

10. The method of claim 1, wherein said at least one executable program includes a plurality of programs that perform a pseudo-random permutation of a memory of said client, evaluate one or more locations of said memory; and restore said memory to a desired state.

11. A method for evaluating the security of at least one remote client, comprising:
providing at least one executable program to be executed by said remote client, said at least one executable program providing an unpredictable result and including at least one function that writes to a memory of said remote client;
receiving a result from said at least one executable program executed by said remote client; and
determining whether said remote client has been corrupted based on an evaluation of said unpredictable result, wherein said at least one executable program is randomly generated and wherein said evaluation of said unpredictable result includes comparing an expected time to an elapsed time between when said at least one executable program is provided to said client and when said result is received, wherein said expected time is based on an expected transmission time of said unpredictable result and an expected execution time by said at least one executable program to compute said unpredictable result.

12. The method of claim 11, wherein said at least one executable program is selected from said plurality of possible programs.

13. The method of claim 11, wherein said at least one executable program includes a plurality of programs that communicate over time using said at least one function that writes to a memory location of said client.

14. The method of claim 11, wherein said at least one executable program includes a plurality of programs that perform a pseudo-random permutation of a memory of said client, evaluates one or more locations of said memory; and restoring said memory to a desired state.

15. A method for evaluating the security of at least one remote client, comprising:
providing at least one executable program to be executed by said remote client, wherein said at least one executable program provides an unpredictable result;
receiving a result from said at least one executable program executed by said remote client;
determining whether said client has been corrupted based on an evaluation of said unpredictable result; and
comparing an expected time to an elapsed time between when said at least one executable program is provided to said client and when said unpredictable result is received, wherein said at least one executable program is randomly generated, wherein said expected time is based on an expected transmission time of said unpredictable result and an expected execution time by said at least one executable program to compute said unpredictable result.

16. The method of claim 15, wherein said at least one executable program is selected from said plurality of possible programs.

17. An apparatus for evaluating the security of at least one remote client, comprising:
a memory; and
at least one processor, coupled to the memory, operative to:
provide at least one executable program to be executed by said remote client, wherein said at least one executable program is one of a plurality of possible programs and wherein said at least one executable program provides an unpredictable result;
receive a result from said at least one executable program executed by said remote client; and
determine whether said remote client has been corrupted based on an evaluation of a correctness of said unpredictable result, wherein said at least one executable program is randomly generated and wherein said evaluation of said unpredictable result includes evaluating comparing an expected time to an elapsed time between when said at least one executable program is provided to said client and when said result is received, wherein said expected time is based on an expected transmission time of said unpredictable result and an expected execution time by said at least one executable program to compute said unpredictable result.

18. The apparatus of claim 17, wherein said at least one executable program includes one or more operations that write to a memory of said client.

19. The apparatus of claim 17, wherein said at least one executable program includes a plurality of programs that communicate over time using at least one function that writes to a memory location of said client.

20. An article of manufacture for evaluating the security of at least one remote client, comprising a tangible machine readable recordable storage medium containing one or more programs which when executed implement the steps of:
providing at least one executable program to be executed by said remote client, wherein said at least one executable program is one of a plurality of possible programs and wherein said at least one executable program provides an unpredictable result;
receiving a result from said at least one executable program executed by said remote client; and
determining whether said remote client has been corrupted based on an evaluation of a correctness of said unpredictable result, wherein said at least one executable program is randomly generated and wherein said evaluation of said unpredictable result includes comparing an expected time to an elapsed time between when said at least one executable program is provided to said client and when said result is received, wherein said expected time is based on an expected transmission time of said unpredictable result and an expected execution time by said at least one executable program to compute said unpredictable result.

\* \* \* \* \*